Dec. 23, 1941.  G. A. TINNERMAN  2,267,379
MOLDING CONSTRUCTION AND THE LIKE
Filed Sept. 28, 1938
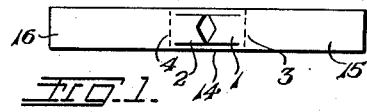
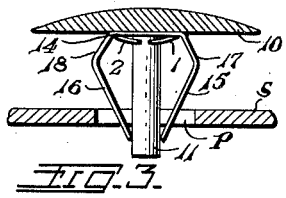
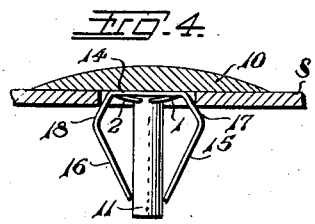
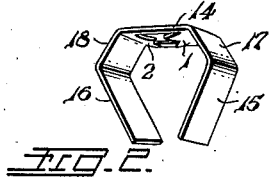
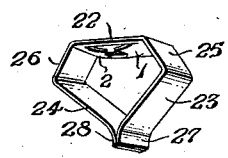
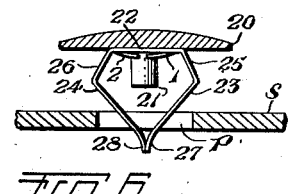
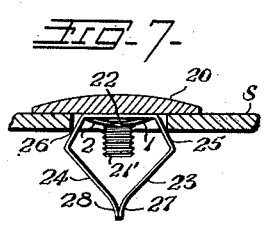
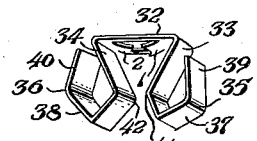
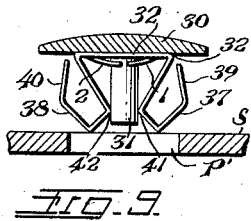
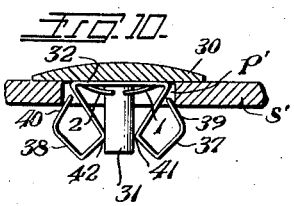
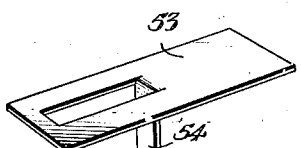
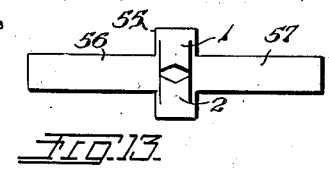
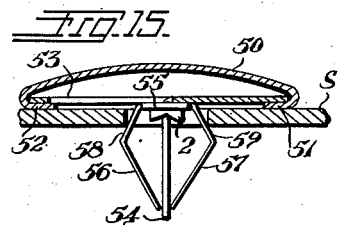
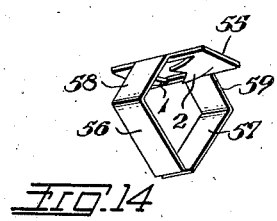
Inventor:
GEORGE A. TINNERMAN
By H. G. Lombard
Attorney Patented Dec. 23, 1941

2,267,379

UNITED STATES PATENT OFFICE 2,267,379

MOLDING CONSTRUCTION AND THE LIKE

George A. Tinnerman, Rocky River, Ohio, assignor, by mesne assignments, to Tinnerman Products, Inc., Cleveland, Ohio, a corporation of Ohio Application September 28, 1938, Serial No. 232,240

19 Claims. (Cl. 189—88)

This invention relates in general to improvements in installations for moldings, trim strips and other finishing objects and deals specifically with improved constructions for retaining, mounting and otherwise securing such objects to supporting surfaces, especially those readily accessible from one side only.

More particularly, this invention is directed to improved forms of stud securing means comprising substantial attaching clips which may be embodied in almost any installation of a molding, trim strip or similar finishing objects such as nameplates, medallions, etc. whereby such articles may be rigidly and securely mounted onto a supporting surface by a simple assembling operation from the accessible side only of such supporting surface.

In the fabrication of sheet metal structures such as automobile body parts, cabinets, refrigerator casings and the like, a most difficult problem is involved in the mounting or securing of a finishing object in desired position on a completed structure in that the supporting surface is often inaccessible from the reverse side wherefore it becomes necessary to employ an attaching means capable of being applied to rigid, positive fastening engagement entirely from the accessible side. To this end, the present invention contemplates generally the provision of such an attaching means comprising a connecting stem, stud or the like on the molding or other finishing object to be mounted, and the use of such connecting stud in combination with a spring fastening rigidly connected thereto and including resilient means such as spring arms having substantial snap fastening engagement in a socket opening provided in the supporting part to secure the molding or other object in fixed, rigid mounted position thereon.

The necessary connecting studs on the finishing object to which the attaching clips are assembled preparatory to the final mounting operation, are easily provided for when the finishing object is in the form of a molded hardened plastic part or metal casting inasmuch as the mold form is readily converted to produce the connecting studs as integral elements on the underface of such finished plastic part or metal casting. Similar connecting studs may, of course, be attached to any metal object by spot welding and if the finishing object is of sheet metal, the necessary connecting stud may assume the form of a simple stem element struck and formed therefrom or otherwise provided by a bent lug element projecting at the underface of the finishing object. The connecting studs thus provided in any event, are admirably suited for use in combination with the spring clip fastenings of the invention rigidly secured thereto and designed to provide the desired interlock between the finishing object and the supporting structure.

A primary object of the invention therefore is to provide an improved construction for mounting a molding, trim strip or other finishing object onto a supporting part comprising a connecting stud, stem or the like provided on the finishing object and a substantial clip fastening rigidly secured thereto by substantial clutch means and including one or more spring arms adapted for substantial snap fastening engagement in a socket opening in a supporting part to which the finishing object is attached.

A further object of the invention is to provide in such an installation, an arrangement whereby the clutch means uniting the clip and connecting stud or stem are arranged in a form of substantial tongues capable of sliding movement in one direction to assembled relation therewith to be held in such position against loosening or reverse movement in an opposite direction upon application of the clip to provide a completed installation.

Another object of the invention is to provide such a clip fastening designed for interlocking the finishing object to the supporting structure under spring tension to provide a substantially positive locked mounting and which clip may be manufactured at very low cost from a single piece of metal strip stock without loss or waste of material whatsoever.

A more specific object of the invention is to provide for use in the combination referred to, a clip constructed from a strip of sheet metal having the mid-portion thereof provided with substantial clutch means for rigidly and positively engaging the connecting stud, and the ends thereof suitably formed in the manner of substantial spring arms designed for positive locking in a socket opening in a supporting part for securing the finishing object thereto.

Still another object of the invention is to provide such a clip especially designed for use with a tongue type of connecting stud or stem provided on a finishing object for mounting the same onto a supporting structure.

A further object contemplates the provision of a concealed mounting for a molding, trim strip or other finishing object constructed of molded plastic material or as a metal casting and formed with an integral connecting stud carrying a spring clip securing device having substantial snap fastening engagement in a socket opening provided in a supporting part from the accessible side only of such part.

Further objects of the invention and other new and useful features in the construction, arrangement and general combination of parts will be readily apparent to those skilled in the art as a description thereof proceeds with reference to the accompanying drawing wherein like reference characters designate like parts throughout the same, and in which:

Fig. 1 represents a blank of sheet metal from which one form of the improved attaching clips of the invention may be constructed;

Fig. 2 is a perspective view of a preferred form of attaching clip formed from the blank of Fig. 1;

Fig. 3 is a fragmentary section through a supporting part showing the attaching clip illustrated in Fig. 2 as assembled onto the connecting stud of a molding or other finishing object and about to be applied to a socket opening in the supporting part;

Fig. 4 is a view similar to Fig. 3 showing the finishing object as applied to mounted position on the supporting part in a completed installation;

Fig. 5 is a perspective of another form of the attaching clip;

Fig. 6 is a fragmentary section through a supporting part showing the clip represented in Fig. 5 as assembled onto a relatively short connecting stud of a finishing object about to be applied to mounted position on the supporting part;

Fig. 7 is a similar view showing the finishing object in applied mounted position and illustrating the adaptability of the attaching clip for use with the connecting stud when provided in the form of a threaded shank;

Fig. 8 is a perspective of a further embodiment of the attaching clip;

Fig. 9 is a fragmentary section through a supporting part showing the attaching clip of Fig. 8 as assembled onto the connecting stud of a finishing object and about to be applied to a relatively large socket opening in the supporting part;

Fig. 10 is a view similar to Fig. 9 showing the finishing object in applied mounted position on the supporting part in a completed installation;

Fig. 11 shows a form of sheet metal retainer employed for interlocking engagement with a channel-shaped finishing object to provide a connecting stud or stem therefor;

Fig. 12 is a section of a molding or like finishing object having the retainer of Fig. 11 assembled into interlocking engagement therewith, said retainer having struck therefrom a stem onto which an attaching clip may be assembled for mounting the finishing object;

Fig. 13 represents a blank from which an attaching clip is formed for use with the connecting stem thus provided;

Fig. 14 shows in perspective, the type of attaching clip formed from the blank of Fig. 13; and, Fig. 15 shows the attaching clip of Fig. 14 as assembled onto the connecting stem or stud of the retainer and applied to fastening position in a socket opening in the supporting part to mount the finishing object thereon in a completed installation.

As respects the mounting of various objects onto supporting parts by concealed fastenings, the attaching arrangement of the present invention is one of general utility and marks a decided advance in the art in that there is required only an inexpensive, one-piece sheet metal attaching clip which dispenses with the use of bolts, screws and nuts and the attendant tedious, time consuming assembling operations which such fastenings require. A further advantage of the improved attaching means resides in the fact that it may be applied directly to a supporting wall from the front face thereof by substantial snap fastening action thereby providing a most important improvement over the usual nut and screw bolt type of fastener which require access to the rear face of the supporting wall for attachment.

For purposes of illustration, the invention is shown in connection with installations for mounting moldings, trim strips, medallions, nameplates and like finishing objects, but it is to be understood that the improved attaching means of the combination is not limited to the type of device herein illustrated and described since it is obvious the same is equally adaptable to use for securing, mounting or attaching various other articles of manufacture such as knobs, handles, shelf supports, etc.

Referring now more particularly to the drawing, Fig. 4 shows an installation for mounting a molding, trim strip or other finishing object onto the supporting parts S, which is usually a sheet metal panel or other plate-like member. In order that the finishing object may be mounted thereon, the said supporting part is provided with one or more perforations P or socket openings disposed at suitably spaced points along which the object extends in mounted position. The perforations may be formed of any suitable contour but usually are round because the tools for providing the same are the cheapest and most readily available, such openings being provided in the supporting part as by punching prior to the application of the finishing object thereto or the installation of such part in a completed assembly, and of course, may be formed in any other convenient manner on an assembly line as by drilling, boring, etc.

The molding, trim material or other finishing object to be applied in accordance with the present invention is designated by the numeral 10 and may assume the form of a relatively wide, thin ornamenting member such as shown in Fig. 3. The molding is provided with the necessary connecting studs in any suitable manner aforesaid, and preferably in the form of integral elements 11 provided on a hardened plastic part or metal casting at little or no added cost in the molding operation. In this relation, a most important advantage is obtained by the present invention in that it is often necessary or desirable for a saving in material that the molding or other finishing object be of comparatively thin cross section and usually of insufficient thickness to receive a metallic insert or threaded screw fastening without being exposed. And accordingly, by the instant construction, the use of threaded fastenings may be avoided and, by employing the improved attaching clips in combination with connecting studs integrally formed on the underface of the hardened plastic part or metal casting, the same may be provided in any selected decorative configuration and of relatively thin cross section yet rigidly and securely mounted onto a supporting part and by completely concealed fastening means to enhance the appearance of the mounting and otherwise embellish the supporting surface and create a highly desirable artistic appearance. Any other finishing object such as a nameplate, medallion or button comprising a sheet metal body member may be provided with similar concealed fastening means by uniting a connecting stud thereto as by spot-welding, brazing, etc. or providing such stud in the manner of a simple stem element struck therefrom or formed by a bent lug element projecting at the underface of the finishing object.

The body 10 of the finishing object may of course assume any selected ornamental or decorative configuration, the same being omitted inasmuch as it constitutes no part of the present invention. It is essential however, that the finishing object be provided with a suitable number of connecting studs 11 projecting at the underface thereof in the maner aforesaid. The finishing object may then be attached to the supporting part by means of one or more spring clips shown in perspective in Fig. 2, comprising substantial clutch means 1, 2 and spring arms 15, 16 designed for substantial snap fastening engagement in the perforation P in the supporting part to mount the finishing object thereon in a manner presently to be described.

As shown in Fig. 1, a preferred form of attaching clip of this character may be most economically provided from an inexpensive section of any selected sheet metal strip stock, preferably spring metal or cold rolled metal having spring characteristics. Thus, a suitable sheet metal strip or blank stamping of predetermined size is provided at substantially its mid-portion with substantial clutch means in the form of cooperating yieldable tongues 1, 2, the extremities of which are spaced by an opening and thereby adapted to function in the manner of a substantial clutch to receive in one direction a connecting stud applied thereto, and frictionally and grippingly engage the same in firm, rigid substantially locked engagement therewith. On either side of the mid-portion provided with such clutch means, the strip is bent along dotted lines 3, 4 to form at least one, preferably two, opposed substantial spring arms 15, 16 which are suitably formed intermediate their lengths to provide guide surfaces inclined toward their free ends to provide a leading end for the device and substantial cam surfaces or work engaging shoulders 17, 18 adjacent the midportion and tapered toward the head 14 of the clip. The extremities of the spring arms may be disposed in spaced relation as shown in Fig 2 or bent to have their tip ends touching when normally untensioned to avoid the tangling of two or more clips when they are handled in numbers or stored in large quantities in bins or shipping containers. Various modified forms of clips of this general character obviously may be constructed with three, four or more spring arms arranged about the head portion of the clip but when this is done, complicated forming dies are required and irregular shaped blanks usually must be provided which of course makes for considerably more expense in manufacture than the simple forms of clip devices illustrated which are formed from ordinary sheet metal strip stock.

It will be noted that the head portion 14 of the clip is purposely designed to be fully received in the socket opening P in the supporting part in order that the underface of the finishing object may be brought into close, flush engagement with the adjacent supporting surface as shown in Fig. 4. Likewise, the tongues serving as the clutch means in the head portion 14 of the clip are preferably bent slightly inwardly such that said head portion may be closely fitted to the underface of the finishing object.

The finishing object, in this instance the molding 10, is mounted to the supporting part by means of one or more connecting studs 11 and attaching clips above described in substantially the following manner. The attaching clip is first connected to its associated connecting stud by inserting such stud in the opening between the tongues 1, 2, or other clutch means provided in the head portion 14 of the clip, and inasmuch as such tongues are yieldable the clip may be advanced along the shank of the stud by relative sliding movement in an axial direction to position the head in substantially flush engagement with the underside of the molding as shown in Fig. 3. In this relation, the extremities of the tongues naturally engage the shank of the connecting stud by substantial line contact and thereby become embedded in the material of such stud in firm, gripping engagement therewith to prevent loosening or reverse movement of the clip from initial assembled relation thereon. At the same time the spring arms 15, 16 are spread sufficient to admit the connecting stud therebetween such that their extremities also are in substantial line contact with the connecting stud in firm, gripping engagement therewith. Thus, the clip is maintained in substantially positive locked assembled relation on the connecting stud to provide the required attaching means for mounting the molding or other finishing object onto the supporting part.

It will be understood that inasmuch as the spring arms 15, 16 of the clip are resilient, the assembly thus provided may be easily and quickly applied to the socket opening P in the supporting part, Fig. 3, and advanced axially therein to cam the inclined guide surfaces of the spring arms against the adjacent peripheral edges of the opening and otherwise compress the same sufficient to pass the work engaging shoulders 17, 18 to the reverse side of the supporting part. The spring arms are designed to engage in the socket opening under compression and inasmuch as the work engaging shoulders thereon are tapered in the form of substantial cam surfaces, they necessarily exert an axial drawing action on the connecting stud when seated and thereby tend to pull the finishing object into close flush engagement with the adjacent surface of the supporting part in providing a mounting in which the attaching means is under continuously effective spring holding action at all times. This compression of the spring arms of the clip in the applied mounted position of the molding or other finishing object, serves not only to maintain the work engaging shoulders 17, 18 in firm, rigid substantially locked engagement to the supporting part but also acts to urge the extremities of the clutch elements 1, 2 and also the extremities of the spring arms toward each other to dig into and become embedded in the material of the connecting stud and thereby provide a rigid, locked engagement of the several parts of the mounting.

The provision of the work engaging shoulders 17, 18 obviously is a matter of choice inasmuch as the same may be formed in the manner of any suitable lug, teeth or abutment means to rigidly and positively engage in the socket opening in the supporting part. However, it has been found that such work engaging shoulders provided in the form of tapered cam surfaces, not only permits the use of a certain size clip with supporting parts of several thicknesses, but also ensures a positive, self seating of the finishing object rigidly in applied mounted position by reason of the expansive force of the spring arms in causing such cam shoulders to ride on the corner edges of the socket opening to the point of most effective fastening engagement and thereby provide a rigid, positive mounting for the finishing object on the supporting part regardless of manufacturing variations therein and possible discrepancies in the size of the socket opening. Likewise, the universality of such a clip for use with the connecting studs of various sizes is materially increased by the provision of the clutch means 1, 2 thereof in the form of cooperating tongues inasmuch as such tongues are relatively yieldable and thereby capable of admitting several sizes of connecting studs to frictionally and grippingly engage any of the same in a most effective expeditious manner. Since that side of the panel or other supporting part not engaged by the finishing object is generally concealed from view, as by the upholstery of a motor car, or the interior panel finish of a cabinet, refrigerator casing or the like, the fact the attaching clips and connecting studs have portions which project through the supporting part and beyond its interior surface is of no consequence since the main object is the rapid yet firm, substantially locked mounting of the finishing object to the exterior of the panel.

The substantial clutch means referred to provided in the head portion 14 of the clip may of course, be provided in any other suitable form or construction, as for example in the manner of spring collars, clamps, clasps and the like designed in accordance with the size of the connecting stud and the strength required. However, by providing such clutch means in form of cooperating tongues, as shown, a further most important advantage is obtained in that such tongues are equally adaptable for use as thread engaging elements for engaging a threaded connecting stud in the manner of a nut. Thus, as illustrated in Fig. 7, in the event the finishing object comes prepared with a threaded stud, the instant clip devices may readily supplant the usual threaded nut intended to be employed requiring access to the reverse side of a supporting part and easily embodied in the installation of the finishing object by a mounting operation taking place entirely from the front, readily accessible side of such part. This is of great importance especially in mass production when it is often found that the required finishing object to be mounted in an installation cannot be secured by its intended nut fastening without access to the interior of a completed structure or by considerable difficulty and inordinate time for applying the nut to its cooperating threaded shank found to be located in a position not readily accessible. In such instances, the devices of the present invention has been found invaluable not only as a standard product but as a clip admirably suited for emergencies on assembly lines where of course, time is a major item in the cost of production and any unnecessary delay adds to such cost either by requiring the services of more operators and equipment, or decrease in the number of units produced.

Figs. 5 and 6 illustrate a modified form of clip especially adapted for use in an alternate construction in which the connecting stud 21 provided on the object 20 to be mounted happens to be relatively short, this being often the case when a saving is obtained in the amount of the material required and it is found advantageous to use smaller and less molding equipment for a metal casing or hardened plastic part. The clip shown in Fig. 5 is constructed in substantially the form and of the same general character as that illustrated in Fig. 2 to comprise a head portion 22 and depending spring arms 23, 24 provided with work engaging shoulders 25, 26 and having their free ends suitably bent to provide surfaces 27, 28 in substantial abutting relation, this arrangement adding to the stiffness of such arms and otherwise increasing the securing action thereof in the mounting the object in a completed installation. The head portion 22 of the clip is provided with the usual form of clutch means comprising cooperating tongues 1, 2, whereupon the slip is assembled onto the relatively short connecting stud 21 as shown in Fig. 6 and the finishing object mounted onto the supporting part substantially in the manner described with reference to Figs 1-4 inclusive and as may be understood from Fig. 7.

Fig. 7 is intended to illustrate the adaptability of any of the clips of the present invention such as that shown in Fig. 5, to ready use as the attaching means for mounting a finishing object having a threaded connecting stud 21', which of course could also be the projecting shank of a threaded fastener passing through an opening in the finishing object. In this instance the clip is assembled onto the threaded connecting stud by threadedly engaging the tongue elements 1, 2 thereof with the stud in the manner of a nut until the head portion 22 is caused to frictionally contact the underface of the finishing object in connected engagement therewith whereupon the same may be mounted in a completed installation by applying the spring arms of the clip to a socket opening in the supporting part substantially in the manner just described.

It is often the case that the socket opening in the supporting part is relatively large and requires that the spring arms of the attaching clip be formed in such manner as to engage therein at widely spaced points without loss of efficiency in the securing action of the clip in applied mounted position. A clip admirably suited for this purpose is shown in perspective in Fig. 8 and may be also formed from an inexpensive section of strip stock material of such length as to comprise a head portion 32 having auxiliary arms 33, 34 depending therefrom on either side thereof and formed into return bends providing upwardly extending spring arms 35, 36 which are further bent or otherwise formed to provide guide surfaces 37, 38, inclined toward the leading end of the device and work engaging shoulders 39, 40 tapered inwardly to serve as substantial cam surfaces so designed as to engage in the socket opening under spring tension. The auxiliary arms 33, 34 are preferably bent inwardly toward each other to present substantial elbows 41, 42, which when normally untensioned, are spaced a distance less than the thickness of the connecting stud in order to grippingly engage the same when the clip is assembled therewith.

Thus, as shown in Fig. 9 the attaching clip is assembled onto the connecting stud 31 of the finishing object 30 by inserting the stud through the opening between the usual spring tongue clutch elements 1, 2, provided in the head portion 32 thereof and advancing the same to spread the auxiliary arms and thus permit the elbows 41, 42 thereon to bear against the lower portion of the stud in firm, gripping engagement therewith thereby adding stiffness to the spring arms 35, 36 and otherwise increasing the efficiency of the securing action supplied thereby. The assembly thus provided may then be applied to the relatively large socket opening P' in the supporting part S' by camming the inclined guide surfaces 37, 38 of the spring arms against the adjacent peripheral edges of the socket opening to compress the same sufficient to seat the work engaging shoulders 39, 40 against the lower corner edge of the socket opening substantially as shown in Fig. 10. Inasmuch as the said work engaging shoulders are provided in the form of substantial cam surfaces, they have a tendency similar to the preferred form of clip, to ride on the lower corner edges of the socket opening to the point of most effective fastening engagement and thereby draw the finishing object in close, flush engagement with the supporting part in mounted position and otherwise securely maintain the several parts of the installation in applied position under continuously effective spring holding action.

Figs. 11–15 inclusive show the invention as embodied in a mounting for a metallic molding, nameplate or like finishing object. Such trim material for example, may assume the form of a relatively wide channel shape 50 having inturned ribs or flanges 51, 52 which may be employed for uniting to the finishing object a retainer comprising a suitable plate 53 carrying an attaching stem 54 struck therefrom and bent downwardly as shown in Fig. 11 to serve as a substantial connecting stud. Such a stem element may of course be provided on a retainer in various other ways and if practical, formed from a suitable lug element bent from a sheet metal part of the finishing object itself. In the illustration of Fig. 12, the retainer is preferably constructed of a section of spring metal such that the body portion 53 thereof is yieldable and flexible and accordingly may be easily and quickly sprung into interlocking relation with the flanges 51, 52 of the molding or other finishing object in fixed, rigid frictional engagement therewith under spring tension.

The attaching clip employed with the stem or connecting stud thus provided on the finishing object, is preferably formed with the clutch elements designed to engage the edges of the stem with the spring arms disposed in abutting relation against the flat side surfaces thereof to prevent relative movement between the clip and stem in assembled relation. Such a clip is illustrated in perspective in Fig. 14 being formed from a blank substantially as represented in Fig. 13, comprising a head portion 55 suitably enlarged to permit the provision of the tongue clutch elements 1, 2, lengthwise thereof with the spring arms 56, 57 extending therefrom along its side edges and having their extremities in substantial abutting relation, the said spring arms being bent intermediate their lengths to provide the preferred type of work engaging shoulders in the form of tapered cam surfaces 58, 59.

Referring to Fig. 15, it will be understood that this form of the attaching clip is applied onto the flat stem 54 of the molding and retainer assembly by sliding the stem edgewise into engagement with the notched extremities of the yieldable clutch tongue elements 1, 2, to seat the head portion thereof closely adjacent the retainer in substantially positive locked engagement therewith with the extremities of the spring arms 56, 57 in abutting relation with the flat side surfaces of the stem thereby preventing relative movement of the clip in assembled relation thereon. Accordingly, with the finishing object thus provided with its necessary attaching clip, the mounting thereof onto the supporting part S is accomplished by seating the work engaging shoulders 58, 59 of the spring arms in the socket opening in such part substantially in the manner described with reference to the embodiment of Figs. 1–4 inclusive, to provide a firm, rigid, positive locked installation under continuously effective spring holding action.

While this invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a spring arm projecting from said head portion, said head portion being provided with substantial clutch means securing the clip to said connecting stud prior to attachment in said socket opening, and said spring arm being bent to extend generally outwardly from adjacent said head portion to define a shoulder adapted for substantial snap fastening engagement in said socket opening and means engaging said stud to add stiffness to said spring arm.

2. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a plurality of spring arms projecting from said head portion, said head portion being provided with substantial clutch means securing the clip to said connecting stud prior to attachment in said socket opening, and at least one of said spring arms being bent to extend generally outwardly from adjacent said head portion to define a shoulder adapted for substantial snap fastening engagement in said socket opening and means engaging said stud to add stiffness to said spring arm.

3. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a spring arm projecting from said head portion, said head portion being provided with substantial clutch means securing the clip to said connecting stud prior to attachment in said socket opening, and said spring arm engaging the stud to add stiffness thereto and having a bent portion defining a generally outwardly extending shoulder spaced from the free end thereof and adapted for substantial snap fastening engagement in said socket opening.

4. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a plurality of spring arms projecting from said head portion, said head portion being provided with substantial clutch means securing the clip to said connecting stud prior to attachment in said socket opening, and at least one of said spring arms engaging the stud to add stiffness thereto and having a bent portion defining a generally outwardly extending shoulder spaced from the free end thereof and adapted for substantial snap fastening engagement in said socket opening.

5. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a spring arm projecting from said head portion, said head portion being provided with substantial clutch means securing the clip to said connecting stud prior to attachment in said socket opening, and said spring arm engaging the stud to add stiffness thereto and being bent outwardly adjacent said head portion to define a generally outwardly extending shoulder spaced from the free end thereof and adapted for substantial snap fastening engagement in said socket opening.

6. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a plurality of spring arms projecting from said head portion, said head portion being provided with substantial clutch means securing the clip to said connecting stud prior to attachment in said socket opening, and at least one of said spring arms engaging the stud to add stiffness thereto and being bent outwardly adjacent said head portion to define a generally outwardly extending shoulder spaced from the free end thereof and adapted for substantial snap fastening engagement in said socket opening.

7. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a plurality of spring arms projecting from said head portion, said head portion being provided with substantial clutch means securing the clip to said connecting stud prior to attachment in said socket opening, said spring arms engaging the stud to add stiffness thereto and extending in generally diverging relation from adjacent said head portion to define generally outwardly extending shoulders adapted for substantial snap fastening engagement in said socket opening.

8. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a plurality of spring arms projecting from said head portion, said head portion being provided with substantial clutch means securing the clip to said connecting stud prior to attachment in said socket opening, said spring arms engaging the stud to add stiffness thereto and being bent generally outwardly adjacent said head portion to define diverging shoulders adapted for substantial snap fastening engagement in said socket opening.

9. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a plurality of spring arms projecting from said head portion, said head portion being provided with substantial clutch means securing the clip to said connecting stud prior to attachment in said socket opening, said spring arms being bent to define shoulders extending generally outwardly from adjacent said head portion and spaced from the free ends of said spring arms, and inclined surfaces extending in converging relation toward said free ends of the spring arms, said free ends engaging the stud to add stiffness to the spring arms.

10. In combination, an object having a connecting stud, a part having a socket opening receiving said connecting stud, and an attaching clip providing a substantial snap fastening connection of said connecting stud in said socket opening in securing said object and part, said clip comprising a section of sheet metal providing a single thickness head portion and a plurality of spring arms projecting from said head portion, said head portion being provided with substantial clutch means securing the clip to said connecting stud prior to attachment in said socket opening, said spring arms being bent intermediate their lengths to define substantial cam shoulders extending in generally diverging relation from adjacent said head portion and inclined surfaces converging toward the free ends of said spring arms, said free ends engaging the stud to add stiffness to the spring arms.

11. In combination, an object provided with a connecting stud in the form of a generally flat stem projecting therefrom, a supporting part having a socket opening, and an attaching clip receivable in said socket opening for mounting said object on the supporting part by said stem, said clip comprising a sheet metal section bent to provide a single thickness head and an arm depending from said head, clutch means on said head securing the clip in nonrotatable assembled relation on said generally flat stem prior to attachment in said socket opening in the supporting part, and a bent portion on said arm defining a shoulder having snap fastening engagement in said socket opening in the supporting part and means engaging said stem to add stiffness to said arm.

12. In combination, a finishing object provided with a connecting stud, a supporting part having a socket opening, and an attaching clip receivable in said socket opening for mounting said finishing object on the supporting part by said connecting stud, said clip comprising a section of sheet metal bent to provide a single thickness head portion and a pair of spring arms extending free therefrom, said head portion being provided with substantial clutch means including a tongue in gripping engagement with said connecting stud to hold the clip in assembled relation thereon prior to attachment in said socket opening in the supporting part with said head portion thereof in firm, bearing engagement with the underside of the finishing object and said spring arms engaging the stud to add stiffness thereto, and at least one of said spring arms being bent to extend generally outwardly adjacent said head portion to define a shoulder designed for positive snap fastening engagement in said socket opening to engage therein under continuous spring tension, whereby said finishing object may be applied entirely from one side of said supporting part to seat said shoulder at the reverse side thereof and thereby retain the finishing object in firm, rigid mounted position thereon.

13. In combination, a molding or like finishing object provided with a connecting stud, a supporting part having a socket opening, and an attaching clip receivable in said socket opening for mounting said finishing object on the supporting part by said connecting stud, said clip comprising a strip of sheet metal bent on either side of its mid-portion to provide a single thickness head portion and a pair of spring arms extending free therefrom, said head portion being provided with substantial clutch means including a tongue in gripping engagement with said connecting stud to hold the clip in assembled relation thereon prior to attachment in said socket opening in the supporting part with said head portion thereof in firm bearing engagement with the underside of the finishing object and said spring arms engaging the stud to add stiffness thereto, said spring arms being provided with guide surfaces inclined toward the free ends thereof and shoulders extending in generally diverging relation from adjacent said head portion designed for positive snap fastening engagement in said socket opening to engage therein under continuous spring tension, whereby said finishing object may be applied entirely from one side of said supporting part to seat said shoulders of the spring arms at the reverse side thereof and thereby retain the finishing object in firm, rigid mounted position thereon.

14. In combination, a finishing object provided with a connecting stud, a supporting part having a socket opening, and an attaching clip receivable in said socket opening for mounting said finishing object on the supporting part by said connecting stud, said clip comprising a section of sheet metal bent to form a single thickness head portion provided with substantial clutch means including a tongue in gripping engagement with said connecting stud to hold the clip in assembled relation therewith prior to attachment in said socket opening in the supporting part, and a pair of yieldable arms depending from said head portion and having portions thereof in gripping engagement with said connecting stud to add stiffness thereto, one of said yieldable arms being bent to extend generally outwardly adjacent said head portion to define a shoulder designed for positive snap fastening engagement in said socket opening in the supporting part to maintain the finishing object in rigid mounted position thereon.

15. In combination, a finishing object provided with a connecting stud, a supporting part having a socket opening, and an attaching clip receivable in said socket opening for mounting said finishing object on the supporting part by said connecting stud, said clip comprising a section of sheet metal bent to provide a single thickness head portion and a pair of spring arms depending therefrom, said head portion being provided with substantial clutch means including a tongue in gripping engagement with said connecting stud adjacent the finishing object to hold the clip in assembled relation thereon prior to attachment in said socket opening in the supporting part with the extremities of said spring arms disposed in gripping engagement with a lower portion of said connecting stud to add stiffness thereto, and one of said spring arms being bent to extend generally outwardly adjacent said head portion to define a shoulder designed for positive snap fastening engagement in said socket opening to engage therein under continuous spring tension and thereby maintain the finishing object in rigid mounted position on the supporting part.

16. In combination, a finishing object provided with a connecting stud, a supporting part having a socket opening, and an attaching clip receivable in said socket opening for mounting said finishing object on the supporting part by said connecting stud, said clip comprising a section of sheet metal bent to provide a single thickness head portion and auxiliary arms extending therefrom, said head portion being provided with substantial clutch means including a tongue in gripping engagement with said connecting stud to hold the clip in assembled relation thereon prior to attachment in said socket opening in the supporting part, at least one of said auxiliary arms comprising a spring arm having a bend providing a generally outwardly extending shoulder spaced from the free end thereof and designed for positive snap fastening engagement in said socket opening to engage therein under continuous spring tension and thereby maintain the finishing object in rigid mounted position on the supporting part, and at least one of said auxiliary arms engaging the stud to add stiffness to the spring arm thereof in such fastening engagement in the socket opening.

17. In combination, a finishing object provided with a connecting stud, a supporting part having a socket opening, and an attaching clip receivable in said socket opening for mounting said finishing object on the supporting part by said connecting stud, said clip comprising a section of sheet metal bent to provide a single thickness head portion and a pair of arms depending therefrom, said head portion being provided with substantial clutch means including a tongue in gripping engagement with said connecting stud to hold the clip in assembled relation thereon prior to attachment in said socket opening in the supporting part, one of said arms engaging the stud to add stiffness thereto and having a return bend forming a spring arm, said spring arm having a bent portion defining a generally outwardly extending shoulder designed for positive snap fastening engagement in said socket opening to engage therein under continuous spring tension and thereby maintain the finishing object in rigid mounted position on the supporting part.

18. In combination, a finishing object provided with a connecting stud in the form of a flat stem projecting therefrom, a supporting part having a socket opening, and an attaching clip receivable in said socket opening for mounting the finishing object on the supporting part by said stem, said clip comprising a sheet metal section providing a head and depending arm, said head being provided with substantial clutch means including a tongue having a notched extremity grippingly engaging the edge of said stem to hold the clip in assembled position thereon with said arm disposed in abutting relation with a flat face thereof, said arm comprising a shoulder designed for positive snap fastening engagement in said socket opening in the supporting part to maintain the finishing object in rigid mounted position thereon.

19. In combination, a molding or like finishing object provided with a retainer having a connecting stud in the form of a flat stem projecting therefrom, a supporting part having a socket opening, and an attaching clip receivable in said socket opening for mounting the finishing object on the supporting part by said stem, said clip comprising a sheet metal section bent to form a head and depending arm, said head being provided with substantial clutch means including a pair of tongues having notched extremities grippingly engaging the edge of said stem to hold the clip non-rotatably in assembled position thereon with said arm disposed in abutting relation with a flat face thereof, said arm comprising a shoulder designed for positive snap fastening engagement in said socket opening in the supporting part to maintain the finishing object in rigid mounted position thereon.

GEORGE A. TINNERMAN.